J. ARCHER.
VARIABLE SPEED GEAR.
APPLICATION FILED NOV. 16, 1906.

954,665.

Patented Apr. 12, 1910.

2 SHEETS—SHEET 1.

WITNESSES
John Camp
F. C. Pennington

INVENTOR.
James Archer
Walter Gunn
By his Attorney.

J. ARCHER.
VARIABLE SPEED GEAR.
APPLICATION FILED NOV. 16, 1906.

954,665.

Patented Apr. 12, 1910.
2 SHEETS—SHEET 2.

WITNESSES.
John Camp
F C Pennington

INVENTOR.
James Archer
Walker Gunn
By his Attorney.

UNITED STATES PATENT OFFICE.

JAMES ARCHER, OF NOTTINGHAM, ENGLAND.

VARIABLE-SPEED GEAR.

954,665.   Specification of Letters Patent.   Patented Apr. 12, 1910.

Application filed November 16, 1906. Serial No. 343,776.

*To all whom it may concern:*

Be it known that I, JAMES ARCHER, a subject of the King of Great Britain and Ireland, and resident of Nottingham, England, have invented certain new and useful Improvements in Variable-Speed Gear for Velocipedes, of which the following is a specification.

This invention relates to and consists of an improved construction and arrangement of three speed gearing for velocipedes characterized by an arrangement of two trains of epicyclic gearing, one for producing the "high" and "normal" speeds and the other for producing the "low" speed and with which latter the driver is always in driving connection, thereby preventing any slipping of the pedals when changing the gears.

Figure 1:
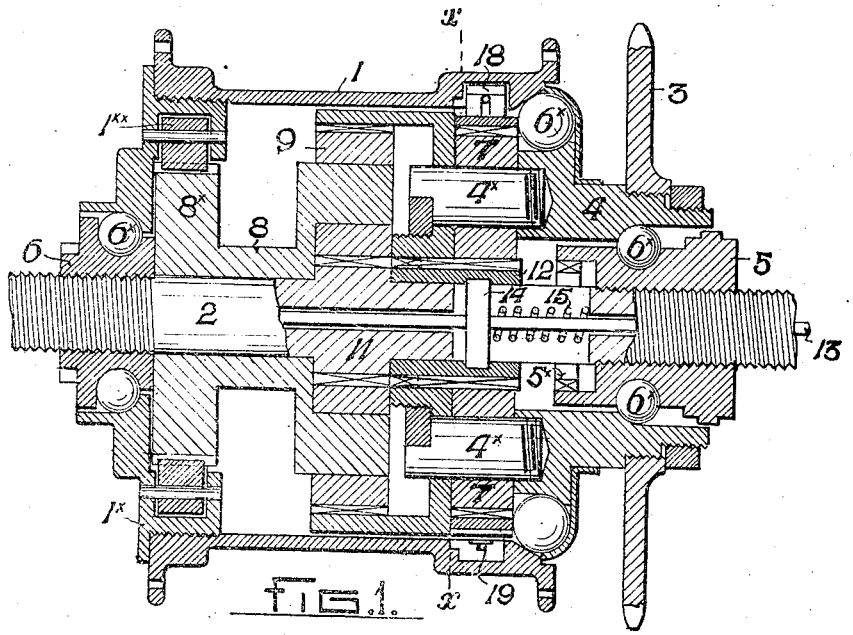
Figure 2:
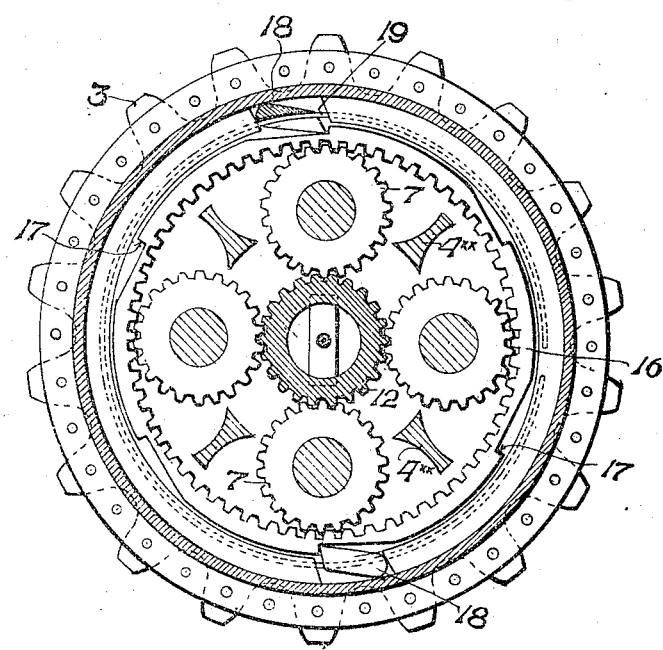
Figures 3, 4:
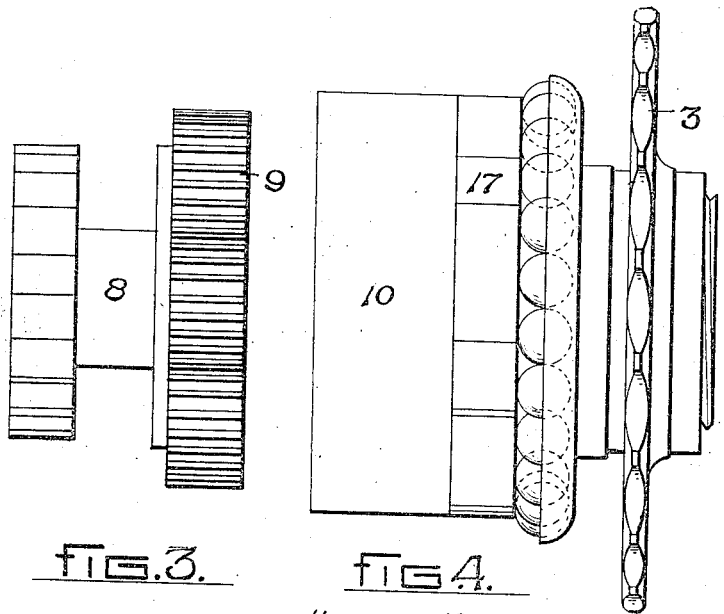
Figure 5:
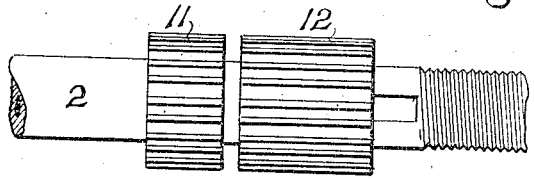
Figures 6, 7:
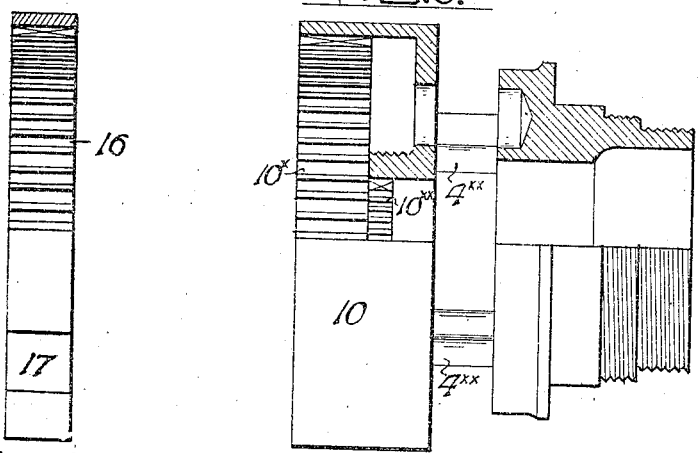

Upon the accompanying drawing, Figure 1 illustrates a longitudinal section of a bicycle wheel hub with the improved three speed gear applied thereto, the position of the parts being that for giving the normal speed. Fig. 2 illustrates a transverse section on line $x$—$x$. Figs. 3 and 4 are detached side views of the gearing separate from the hub. Fig. 5 illustrates the hub axle and the sun pinions thereon. Fig. 6 illustrates a part longitudinal section and part exterior view of the gear shell. Fig. 7 illustrates a detached view (partly in section) of the loose gear ring.

The several parts may be described as follows:—1 is the hub, 2 the fixed hub axle, and 3 the sprocket or chain wheel, this latter being carried by the part 4, hereinafter called the driver. The hub and driver take their bearings upon the bushes 5, 6 via antifriction balls $6^x$. Upon studs $4^x$ carried by the driver 4 is a set of planetary pinions 7. Upon a tubular member 8, loosely and rotatably fitting the axle 2, and hereinafter called the "planet cage," is a further set of planetary pinions 9. In one with or connected by cross stays $4^{xx}$, see Fig. 6, to the driver is a gear ring 10, i. e. a cylindrical member with spur teeth $10^x$ on its inner face, see Fig. 6. Upon the axle 2 are two "sun" pinions 11, 12, one for the set of planetary pinions 7, and the other for the set of planetary pinions 9. The pinion 11 is a fixture on the axle, but the pinion 12 is loose and free to be slid longitudinally along the axle by means say of the rod 13, cross-bar 14 and spring 15.

Upon the bush 5, which is fixed to the axle, is a ring of clutch teeth $5^x$, and upon the inner face of the boss of the ring 10 is a further ring of clutch teeth $10^{xx}$, see Fig. 6. Upon being moved along the axle in one direction the pinion 12 is designed to engage and be clutched to the teeth in the bush 5, and thus be held against rotation, while upon being moved in the opposite direction the said pinion is designed to engage and be clutched to the teeth $10^{xx}$ of the gear ring; and thus be adapted to rotate solid with the gear ring 10 and pinions 7. Upon being moved to a central position the pinion 12 is free of both the teeth $5^x$ and $10^{xx}$ and meshes only with the planetary pinions 7. 16 is a further gear ring with which the pinions 7 mesh see Fig. 7, and upon the exterior of such ring are ratchet teeth or recesses 17. Let into small cavities in the hub are pawls 18, held in position by say a split hoop or ring 19 common to the series.

In one with the planet cage 8 is a flange $8^x$ and in the periphery of such flange are ratchet teeth. Upon the inner part of the hub and carried by say the end bush $1^x$ of the hub is a series of pawls $1^{xx}$ or any suitable form of silent ratchet.

The action of the combined mechanism with the parts in the position shown in the drawing is as follows:—The rotation of the pedals of the bicycle in the forward direction causes the like rotation of the driver 4, which with the pinions 7 and gear ring 10 clutched solid to each other by the pinion 12, drives the hub through the gear ring 16 and pawls 18, thus giving the "normal" speed; the planetary pinions 9 for the time being, running idle at a reduced speed although always remaining in driving connection with the gear ring 10 and driver 4, and the pawls $1^{xx}$ overrunning the ratchet teeth in the planet cage flange $8^x$.

When the sun pinion 12 is moved to the right and caused to engage the teeth $5^x$ in the bush 5, and thus also made free of the teeth $10^{xx}$ in the gear ring 10, the hub is rotated at the "high" speed, the drive taking place through the pinions 7, gear ring 16 and pawls 18, the gear ring 10 and pinions 9 again rotating idly, but always being in driving connection with the driver, and the pawls $1^{xx}$ again over-running the teeth in the flange $1^x$.

When the sun pinion 12 is moved to the left and caused to lie clear of both the teeth $10^{xx}$ in the gear ring 10 and teeth $5^x$ in the bush 5, the hub is rotated at the "low" speed, the drive taking place through the pinion studs 4ˣ, gear ring 10, pinions 9 and pawls 1ˣˣ.

When the pedals of the bicycle are held stationary for the purposes of free-wheeling, the pawls 18 slip over the gear ring 16, and the pawls 1ˣˣ slip over the teeth in the flange 8.

By reason of the driver always being in driving connection with the pinions 9 no slipping of the pedals can take place at the time of moving the pinion 12 for changing the speed. The stays 4ˣˣ are formed by cutting out the metal of a cylindrical neck connecting the driver and ring. The parts may be connected by the studs 4ˣ only.

What I claim is:—

1. In a variable three speed gearing for velocipedes, a wheel hub and a fixed axle therefor, a driving member, and two independent sets of epicyclic gearing, these latter being arranged within the hub, one set of which serves to drive the hub at a low speed and with which the driving member is constantly in gear, and the other set of which serves to drive the hub at a high or normal speed, and means whereby the hub may run free when the driving member is held stationary and whereby the hub may overrun the low speed gearing when the high and normal speed gearing is in operation, substantially as herein set forth.

2. In a variable three speed gearing for velocipedes, the combination with a wheel hub and fixed axle therefor, of a driving member and two independent sets of epicyclic gearing, one for the low speed and the other for the high and normal speeds, both arranged within the hub, and each set of gearing comprising an internally toothed gear ring, planetary pinions and a sun pinion, the sun pinion of one set being fixed to the axle and the sun pinion of the other set being loose and free to slide and in certain positions rotate, and the gear ring of one set of gearing being integral with the driving member and carrying the pinions of the other set, and means coöperating with said gearing whereby the motion of the driving member may be transmitted to the hub through one or other of the sets of gearing and whereby when the set of gearing for driving the hub at the high and normal speeds is in operation the gearing for the low speed is over-run by the hub, and whereby when the gearing for the low speed is in operation the other gearing is rendered inoperative, and also whereby the hub may run free on any speed when the driving member is held stationary, substantially as herein set forth.

3. In a variable three speed gearing for velocipedes, the combination with a wheel hub, of a driving member, a gear ring connected with such driving member and having spur and clutch teeth, a set of planetary pinions and their axes carried by the said driving member, a further and loose annular gear ring surrounding and meshing with the said pinions and having ratchet teeth in its periphery, a further set of planetary pinions meshing with the spur teeth in the gear ring connected with the driving member, a non-rotary axle for the hub, two sun pinions on the axle, one always fixed and meshing with the said further set of pinions, and the other loose but always meshing with the first named set of pinions and capable of being moved along the axle and of being clutched to the axle or to the said clutch teeth on the gear ring connected with the driving member or of being made free of both, pawls whereby the hub may run free on any speed when the driving member is held stationary and whereby the hub may over-run the gearing giving the low speed when the gearing for giving the high and normal speeds is in use, substantially as herein set forth.

4. In a variable three speed gearing for velocipedes, the combination with a wheel hub of a driving member, a gear ring connected with the said driving member and having spur and clutch teeth, a set of planetary pinions and their axes carried by the said driving member, a further and loose annular gear ring surrounding and meshing with the said pinions and having ratchet teeth in its periphery, a non-rotary axle for the hub, a sun pinion on the axle capable of being moved along the axle and of being clutched to the gear ring connected with the driving member or to the axle or be moved free of both while always being in mesh with the said pinions, and pawls between the hub and the said further annular gear ring, substantially as and for the purposes set forth.

In witness whereof I have hereunto set my hand in the presence of two witnesses.

JAMES ARCHER

Witnesses:
  THOS. H. COOK,
  HORACE BUNN.